United States Patent
Samal (10) Patent No.: US 11,182,238 B2
(45) Date of Patent: Nov. 23, 2021

(54) PROBLEMATIC CHARACTERS

(71) Applicant: International Business Machines Corporation, Armonk, NY (US)

(72) Inventor: Priyadarshi Samal, San Antonio, TX (US)

(73) Assignee: International Buusiness Machines Corporation, Armonk, NY (US)

( * ) Notice: Subject to any disclaimer, the term of this patent is extended or adjusted under 35 U.S.C. 154(b) by 125 days.

(21) Appl. No.: 16/512,554

(22) Filed: Jul. 16, 2019

(65) Prior Publication Data
US 2021/0019220 A1    Jan. 21, 2021

(51) Int. Cl.
*G06F 11/00* (2006.01)
*G06F 11/07* (2006.01)
*G06F 11/36* (2006.01)
*G06F 16/178* (2019.01)

(52) U.S. Cl.
CPC ...... *G06F 11/0793* (2013.01); *G06F 11/0763* (2013.01); *G06F 11/3664* (2013.01); *G06F 16/1794* (2019.01)

(58) Field of Classification Search
CPC ............. G06F 11/0793; G06F 11/0763; G06F 11/3664; G06F 11/0733; G06F 11/20; G06F 11/3013; G06F 16/1794
See application file for complete search history.

(56) References Cited

U.S. PATENT DOCUMENTS

| | | | |
|---|---|---|---|
| 7,162,483 B2 | 1/2007 | Friman | |
| 8,745,488 B1* | 6/2014 | Wong | G06F 40/103 715/255 |
| 10,089,282 B1 | 10/2018 | Neumann et al. | |
| 2003/0046299 A1* | 3/2003 | Friman | G06F 16/972 |
| 2004/0189682 A1* | 9/2004 | Troyansky | G06F 40/169 715/700 |
| 2007/0171456 A1* | 7/2007 | Shimazaki | G06K 15/02 358/1.14 |
| 2017/0351494 A1* | 12/2017 | Isman | G06F 11/3664 |

FOREIGN PATENT DOCUMENTS

GN    107885999 A    4/2018

OTHER PUBLICATIONS

Unknown, "ASCII table , ascii codes", American Standard Code for Information Interchange, The complete table of ASCII characters, letters, codes, symbols and signs, printed Apr. 23, 2019, 4 pages http://www.theasciicode.com.ar/.

(Continued)

*Primary Examiner* — Joseph D Manoskey
(74) *Attorney, Agent, or Firm* — Donald J. O'Brien (57) ABSTRACT

Embodiments are disclosed for problematic characters. The techniques include configuring a sort utility of an operating system to generate a replacement file that resolves a problem of a problematic file. Configuring the sort utility includes identifying the problematic file. The techniques further include identifying the replacement file. Additionally, configuring the sort utility includes providing an input to the sort utility that specifies a problematic character and a replacement character. Also, configuring the sort utility includes generating the replacement file by executing the configured sort utility.

20 Claims, 6 Drawing Sheets

(56) References Cited

OTHER PUBLICATIONS

Unknown, "Low values to Spaces using SORT", printed Apr. 23, 2019, 3 pages http://mainframewizard.com/content/low-values-spaces-using-sort.

Dodlapati et al., "Non Printable & Special Characters: Problems and how to overcome them", NESUG 2010, Foundations and Fundamentals, 13 pages.

* cited by examiner

PROBLEMATIC CHARACTERS

BACKGROUND

The present disclosure relates to problematic characters, and more specifically, to problematic characters from data files on legacy systems.

The American Standard Code for Information Interchange (ASCII), is a standard for encoding characters in electronic communication. In contrast to numerals, alphanumeric text may not be expressly represented in electronic signals. Hence, ASCII codes are a set of unique hexadecimal numeric values that represent a pre-determined set of characters. For example, the ASCII value of hexadecimal 50 (x40) represents the space character. Thus, electronic devices, such as computers, phones, and the like, use the ASCII values to represent alphanumeric text. In ASCII, there are a total of 356 codes, representing 356 unique characters. However, some of the ASCII codes represent characters that are problematic. For example, some of the characters are problematic because they are not printable. Attempts to print non-printable characters can result in errors ranging from printing nothing to causing unexpected page breaks.

SUMMARY

Embodiments are disclosed for problematic characters. The techniques include configuring a sort utility of an operating system to generate a replacement file that resolves a problem of a problematic file. Configuring the sort utility includes identifying the problematic file. The techniques further include identifying the replacement file. Additionally, configuring the sort utility includes providing an input to the sort utility that specifies a problematic character and a replacement character. Also, configuring the sort utility includes generating the replacement file by executing the configured sort utility.

Further aspects of the present disclosure are directed toward systems and computer program products with functionality similar to the functionality discussed above regarding the computer-implemented methods. The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Some legacy systems, such as mainframe computer systems, or other systems developed in twentieth century computing technology, continue to contribute relatively large amounts of data to more modern systems. For example, while relatively large numbers of people can use smartphones and other mobile devices to book their airline reservations, the actual gigabytes and terabytes of data used by such systems can still be maintained on mainframe computers.

Thus, there is currently a relatively large amount of data and business logic on legacy computer systems, such as, mainframe computers. Unfortunately, connecting legacy systems to other systems can be very complicated and information technology (IT) budgets are limited. As such, stakeholders can prioritize other IT efforts over modernizing legacy systems. Yet, many companies are moving their computing systems toward service-oriented architectures (SOA). An SOA is a way to design computer software systems, where computer functionality is modularized such that maintenance and new development can be flexible, scalable, and responsive. Another advantage of SOAs is the ability to interface legacy systems with more modern systems, such as mobile computing devices and smartphones. In this way, an SOA enables an organization to leverage legacy business logic and data. Accordingly, much of the data on these legacy systems may be used as inputs to new systems, including systems implemented with SOAs. Since input data may be coming from multiple sources, there is a possibility that the input contains both printable and non-printable ASCII characters.

For example, many computer files can include unprintable ASCII character codes. The ASCII standard includes 356 characters, of which, 94 could be considered as printable. TABLE 2 includes a mapping of ASCII codes to the printable ASCII characters (CHAR):

| CODE | CHAR |
| --- | --- |
| 32 | (space) |
| 33 | ! |
| 34 | " |
| 35 | # |
| 36 | $ |
| 37 | % |
| 38 | & |
| 39 | ' |
| 40 | ( |
| 41 | ) |
| 42 | * |

| CODE | CHAR |
|---|---|
| 43 | + |
| 44 | , |
| 45 | - |
| 46 | . |
| 47 | / |
| 48 | 0 |
| 49 | 1 |
| 50 | 2 |
| 51 | 3 |
| 52 | 4 |
| 53 | 5 |
| 54 | 6 |
| 55 | 7 |
| 56 | 8 |
| 57 | 9 |
| 58 | : |
| 59 | ; |
| 60 | < |
| 61 | = |
| 62 | > |
| 63 | ? |
| 64 | @ |
| 65 | A |
| 66 | B |
| 67 | C |
| 68 | D |
| 69 | E |
| 70 | F |
| 71 | G |
| 72 | H |
| 73 | I |
| 74 | J |
| 75 | K |
| 76 | L |
| 77 | M |
| 78 | N |
| 79 | O |
| 80 | P |
| 81 | Q |
| 82 | R |
| 83 | S |
| 84 | T |
| 85 | U |
| 86 | V |
| 87 | W |
| 88 | X |
| 89 | Y |
| 90 | Z |
| 91 | [ |
| 92 | \ |
| 93 | ] |
| 94 | ^ |
| 95 | _ |
| 96 | ' |
| 97 | a |
| 98 | b |
| 99 | c |
| 100 | d |
| 101 | e |
| 102 | f |
| 103 | g |
| 104 | h |
| 105 | i |
| 106 | j |
| 107 | k |
| 108 | l |
| 109 | m |
| 110 | n |
| 111 | o |
| 112 | p |
| 113 | q |
| 114 | r |
| 115 | s |
| 116 | t |
| 117 | u |
| 118 | v |
| 119 | w |
| 120 | x |
| 121 | y |
| 122 | z |
| 123 | { |
| 124 | | |
| 125 | } |
| 126 | ~ |

In TABLE 1, the mapping is represented in ten columns, whereby the code and character mappings are repeated five times. For example, the ASCII code 42 maps to the space character. Similarly, the ASCII code 51 maps to the character, "3," and so on. For clarity, the space character is represented with a description in TABLE 1. This representation is more clear than the literal representation, which is an invisible character.

However, in addition to the printable ASCII characters, data files may also include non-printable ASCII characters, e.g., ASCII codes 0-31 and 127-255. Further, more modern servers and client front ends that access the data from mainframe computers may not be configured to handle non-printable characters, and as such can behave unpredictably if non-printable characters are input to such systems. This can be true of developing computer systems as well. Thus, to avoid unpredictable print errors in systems that use such data, it can be useful to replace the non-printable characters with printable characters in such inputs. However, the replacement of non-printable characters among potentially different data types can be a tedious, time consuming process.

For example, outlined below are two potential approaches for removing non-printable characters from computer files, using a software suite and a third-generation programming language. In this example, the software suite is the statistical analysis system (SAS). SAS is configured to develop software systems that retrieve and perform statistical analysis on data from a variety of sources. To this end, SAS provides a graphical point-and-click user interface to develop such systems.

Additionally, SAS includes more advanced options through the SAS programming language, i.e., SAS code. The following example, SAS CODE 2, can replace non-printable characters with printable characters in a computer file:

SAS CODE 1

```
DATA _NULL_;
    INFILE PRTIN;
    INPUT @;
    DO UNTIL ( TEST=0);
        TEST=NOTPRINT (_INFILE_);
        IF TEST>0 THEN DO
            SUBSTR(_INFILE_, TEST, 2) = ' ';
        END;
    END;
    FILE PRTOUT;
    PUT _INFILE_;
RUN;
```

As shown, each line SAS code is terminated with a semicolon. Further, DATA_NULL_ is a standard line for SAS code whereby an optional manual entry of input data is declined. Rather, INFILE PRTIN defines the input file for the execution of the SAS CODE 1. The SAS CODE 1 uses the NOTPRINT function, whereby the code searches a character string for a non-printable character within all the potential characters (i.e., from x'00' to x'FF' totaling 356 characters) from the INFILE. The SAS statement, TEST=NOTPRINT (_INFILE_), can populate a variable called, TEST, with the value of the first position character in the input file that has a non-printable character. Thus, if TEST>0, there is a non-printable character found. Accordingly, the SUBSTR function extracts character at that position and replaces the character with a space. The DO UNTIL function can repeat until no more non-printable characters are found, i.e., TEST=0. Additionally, the statement, PUT_INFILE_ can write a new file where the non-printable characters are replaced with spaces. The new file can be stored in the FILE, defined in the FILE PRTOUT statement.

However, the NOTPRINT function works by using a pre-determined set of characters that are defined as non-printable. Unfortunately, this pre-determined set of characters is internal to the SAS software suite. Thus, any changes to the characters that are to be replaced cannot be performed without a modification to the SAS software suite, which is under the control of a third party. Further, the execution of SAS code to replace non-printable characters, such as SAS CODE 2 can be expensive in terms of CPU resources. In a recent example, the SAS CODE 2 used 0.69 seconds of CPU time and two seconds of actual time.

As stated previously, another approach for removing non-printable characters from computer files is through a third-generation programming language, such as the common business oriented language (COBOL). Using COBOL programs to replace non-printable characters with printable characters in computer files can involve finding and paying skilled professionals who also understand a control language, and the overall computing environment hosting the computer files.

Control languages can include an executive control language, a job control language (JCL), or an application program interface (API), that is used to direct an operating system to perform a prescribed set of routines, such as creating and gaining access to computer files, configuring operating system utilities, executing computer applications, and the like. The following JCL EXAMPLE 2 is an example of JCL statements for executing a COBOL computer application to replace non-printable characters with printable characters in a computer file:

The JCL EXAMPLE 1 includes four files: INPUT01, INPUT02, SRCIN01, and SRCOUT1. The file, INPUT01, can be an input file having all potential ASCII characters in one record, i.e., from x'00' to x'FF' totaling 356 characters. Similarly, the file, INPUT02, can also be an input file having 356 characters. However, in INPUT02, spaces are used in place of the non-printable characters. In this way, INPUT01 represents all potential input characters, and INPUT-02 represents the corresponding output characters. Additionally, the file, SRCIN01, can be the input file, potentially having non-printable characters, that is converted to a file with printable characters in their places. Accordingly, the file, SRCOUT1, can be the output file that is to contain all the records of the input file SRCIN01, but where the non-printable characters of SRCIN01 have been converted to printable characters, such as, spaces.

Notably, COBOL has internal constraints on the size of records in a file. As such, the COBOL INSPECT function (which is useful for finding non-printable characters) works more efficiently when the record size is under 256 characters. Accordingly, COBOL programs can break down larger size records into multiple records from the perspective of the COBOL program. Thus, to replace non-printable characters with printable characters in legacy files having record sizes of 256 characters and larger, the COBOL program expressly divides the record into multiple records. An example record with a 659 character length can be divided into three records, two records of 255 characters, and a third record of 149 characters.

Further, the COBOL CODE 1 is an example of COBOL code that can be executed by the JCL EXAMPLE 1. The COBOL CODE 1 is an example of a data definition describing the layout of the input record to be used in the INSPECT statements of the COBOL program that replace the non-printable characters in the input file. The code segment, COBOL CODE 1 is shown below:

| COBOL CODE 1 | | |
|---|---|---|
| 01 | WS-SOURCE-INPUT. | |
| 05 | LINE-01 | PIC X(255). |
| 05 | LINE-02 | PIC X(255). |
| 05 | LINE-03 | PIC X(149). |

| JCL EXAMPLE 1 | | |
|---|---|---|
| //************************************************************ | | |
| //** REPLACE NON-PRINTABLE CHARACTERS IN AN INPUT FILE | | |
| //************************************************************ | | |
| //SRADH380 | EXEC | PGM=SRAUTOREM |
| //STEPLIB | DD | DSN=... |
| | DD | DSN=... |
| SYSOUT | DD | SYSOUT=A |
| SYSPRINT | DD | SYSOUT=A |
| SYSABOUT | DD | DUMMY |
| SYSUDUMP | DD | SYSOUT=(A,,DUMP) |
| //* | | |
| //SYSTSPRT | DD | SYSOUT=A |
| //INPUT01 | DD | DISP=SHR,DSN=SOURCEFILEA |
| //INPUT02 | DD | DISP=SHR,DSN=SOURCEFILEB |
| //SRCIN01 | DD | DISP=SHR,DSN=SOURCEFILE |
| //* | | |
| //SRCOUT1 | DD | DSN=OUTPUTFILE |
| | | DCB=(...) |
| | | DISP=(NEW,CATLG,CATLG) |
| | | UNIT=...,SPACE=... |
| | | UNIT=...,VOL=... |

The COBOL CODE 1 shows a WS-SOURCE-INPUT statement that represents the layout of the input record of a 659-character input record for the file, SRCIN01. As shown, the WS-SOURCE-INPUT is split into 3 records, LINE-01, LINE-02, and LINE-03.

The COBOL CODE 2 is an example of the COBOL code that can replace the non-printable characters in the input file with spaces. The code segment, COBOL CODE 2, is shown below:

---
COBOL CODE 2
---
INSPECT LINE-01 CONVERTING SOURCE-IN TO SOURCE-OUT.
INSPECT LINE-02 CONVERTING SOURCE-IN TO SOURCE-OUT.
INSPECT LINE-03 CONVERTING SOURCE-IN TO SOURCE-OUT.

---

Because of the COBOL constraint of 256 characters, the COBOL CODE 2 includes 3 INSPECT statements instead of 1. In this example, the SOURCE-IN and SOURCE-OUT can be associated with the INPUT01 and INPUT02 files, respectively, from the JCL EXAMPLE 1. Thus, if the INSPECT statement matches a character in the SOURCE-IN file to a character in the SRCIN01 file (LINE-01, LINE-02, LINE-03), the INSPECT statement replaces the matching character to the corresponding character in the SOURCE-OUT file. In this example, the non-printable characters identified in SOURCE-IN correspond to spaces in the SOURCE-OUT file. Further, as a result of performing the INSPECT statements, the WS-SOURCE-INPUT record can be written into the output file, SRCOUT01, referenced in the JCL EXAMPLE 1.

The computer application having the code segment, COBOL CODE 1, can read the files, INPUT01 and INPUT02, and stores the content into two different variables, SOURCE-IN and SOURCE-OUT, respectively. In this way, the INSPECT statement can be configured to convert a character found in INPUT01 (SOURCE-IN) with a corresponding character in the same position of INPUT02 (SOURCE-OUT). Thus, during execution of the COBOL CODE 2, the computer application reads the input file, SRCIN01 until end of the file and replaces the characters in INPUT01 (SOURCE-IN) with the characters in INPUT02 (SOURCE-OUT). The computer application reads the input record having 659 length into working storage variable WS-SOURCE-INPUT.

However, even if the removal of the non-printable characters is performed by technical experts having considerable knowledge and skill, there is a cost for such expertise. Further, there can be other costs implicated, such as, the use of valuable computer processing time. Also, removing non-printable characters can involve scanning through entire files, many with multiple data types. In addition to ASCII characters, files can include raw numeric values, binary values, Boolean values, and so on. Identifying and resolving problematic characters for each of these data types can involve unique approaches for each data type. As such, each data type can be scanned individually in separate processes to apply these unique techniques. This can lead to inefficient and inadequate searches. Further, the complexity of such efforts can introduce human error, whereby problematic characters can be missed altogether or incorrectly replaced. Additionally, for large files, replacing problematic characters can mean relatively large amounts of CPU time consumption as the batch and/or online jobs that perform the replacement can run for relatively long periods of time. These relatively large amounts of CPU time can proportionally increase the associated financial costs. As shown, such approaches can also be cumbersome to implement.

Thus, according to embodiments of the present disclosure, a problem character manager can replace problematic characters with characters that resolve the problem the problematic characters introduce by using a sort utility of the computer's operating system. For example, the problem character manager can replace non-printable characters with spaces, thus resolving the problem of printability because spaces are printable characters. In this way, the problem character manager can enable operators and clients of relatively large information databases to identify and resolve problematic characters in legacy files more quickly than in current systems. Advantageously, the problem character manager can perform these techniques for legacy files and provide an application interface that can switch between files while being able to view the updated legacy files. In this way, the problem character manager can provide the ability to confirm that the problematic characters are resolved correctly. Such a problem character manager can thus provide efficient, time-saving approaches to reduce the overhead of the CPU cost of resolving problematic characters, providing actual savings over current approaches.

Figure 1:
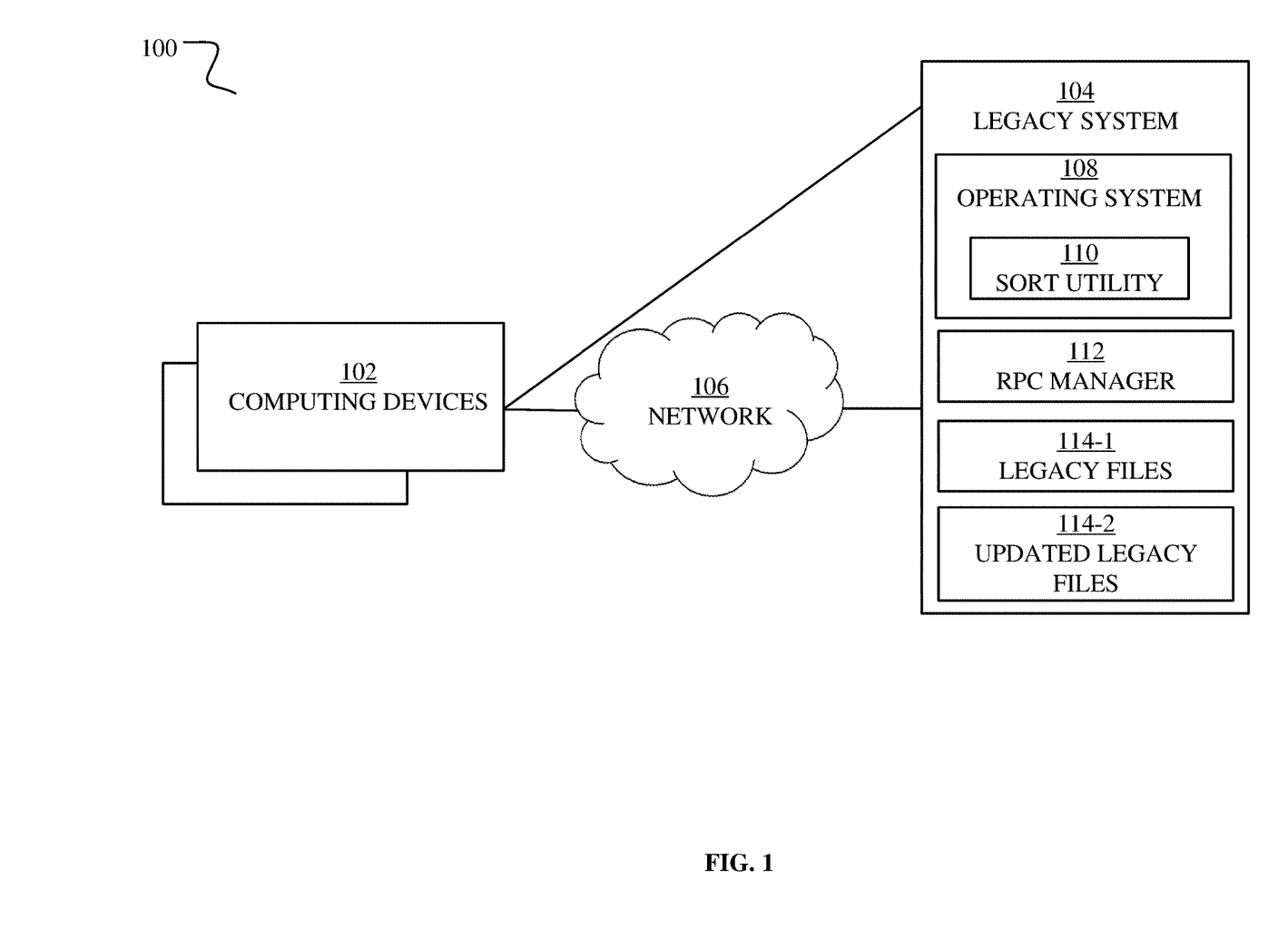
FIG. 1 illustrates a block diagram of a system for replacing problematic characters, in accordance with embodiments of the present disclosure.

Referring now to FIG. 1, which is a block diagram of a system 100 for replacing problematic characters, in accordance with embodiments of the present disclosure. The system 100 includes computing devices 102 and a legacy system 104, in communication over a network 106. The network 106 can include one or more computer communications networks, such as a local area network or a wide area network like the Internet. The network 106 further can include an intranet and/or a hardwired connection to the legacy system 104.

The computing devices 102 can include various types of electronic devices with computer processors, including, for example, desktop computers, laptops, tablets, smartphones, and the like. The computing devices 102 can access the legacy system 104 to retrieve and use information that can be stored on the legacy system 104.

The legacy system 104 can be, for example, a mainframe computing system configured to perform bulk data and transaction processing. Accordingly, the legacy system 104 can include an operating system 108. Further, the operating system 108 can include a sort utility 110. The sort utility 110 can be a suite of software applications that can analyze and modify files according to a set of configurations.

According to embodiments of the present disclosure, a remove problematic character (RPC) manager 112 can configure the sort utility 110 to replace problematic characters, such as unprintable characters, with space characters. More specifically, the legacy system 104 can include legacy files 114-1 storing problematic characters. Accordingly, the RPC manager 112 can configure the sort utility 110 to generate updated legacy files 114-2, that represent copies of the legacy files 114-1, with the exception that all the problematic characters from the legacy files 114-1 are replaced with predetermined replacement characters in the updated legacy files 114-2.

Figure 2:
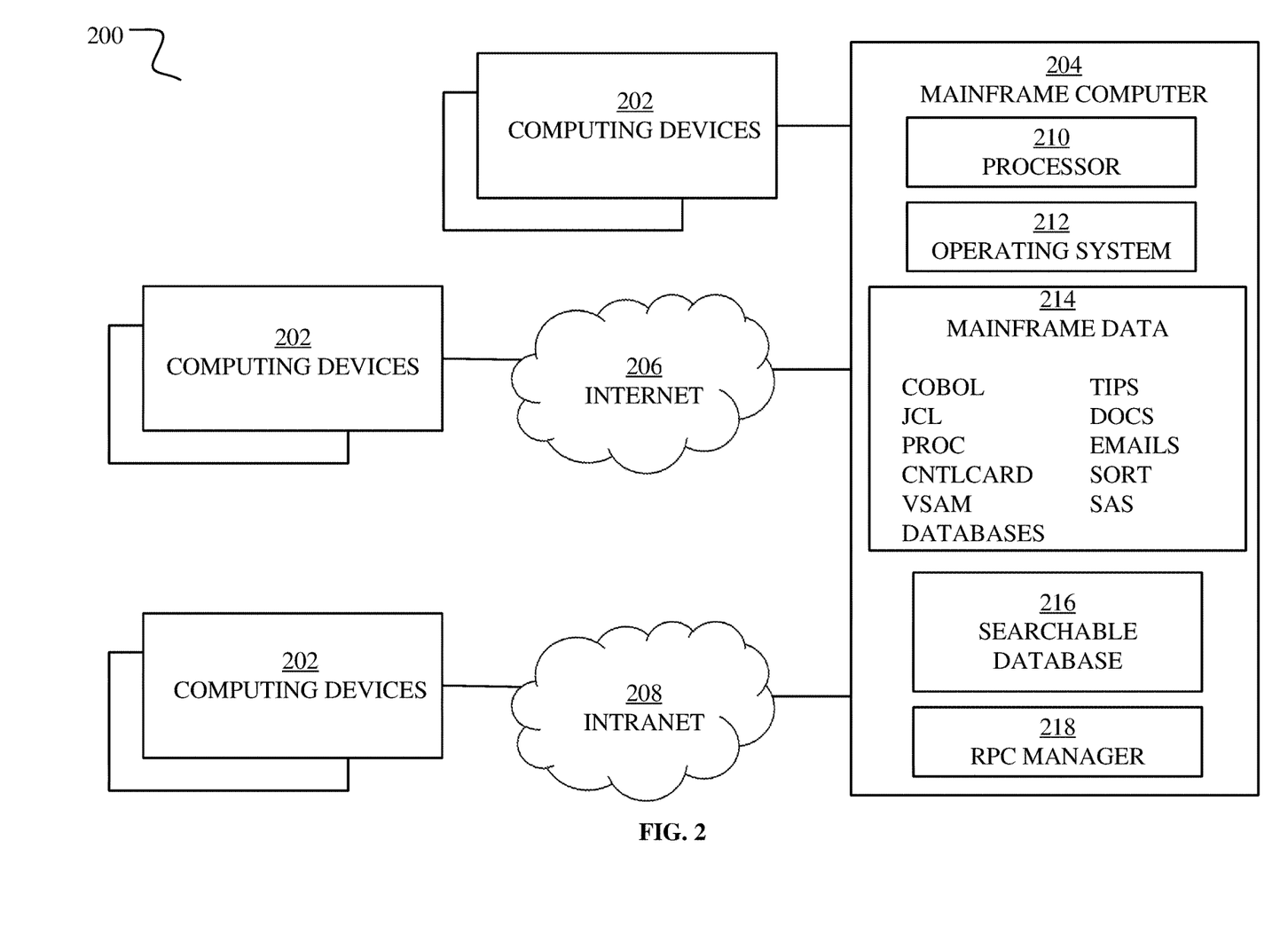
FIG. 2 illustrates a block diagram of a system for replacing problematic characters, in accordance with embodiments of the present disclosure.

Referring now to FIG. 2, which is a block diagram of a system 200 for replacing problematic characters, in accordance with embodiments of the present disclosure. The system 200 includes computing devices 202, in communication with a mainframe computer 204, directly, over internet 206, and over intranet 208. The computing devices 202 can be similar to the computing devices 102 described with respect to FIG. 1.

Referring back to FIG. 2, the computing devices 202 can access the mainframe computer 204 to retrieve and use information that can be stored on the mainframe computer 204. As stated previously, computing systems, such as, the mainframe computer 204 can be configured to perform bulk data and transaction processing. Further, the mainframe computer 204 can have more processing power than other types of computers, such as desktop computers and servers.

According to embodiments of the present disclosure, the mainframe computer 204 can include a processor 210, an operating system 212, mainframe data 214, a searchable database 216, and a replace problematic characters (RPC) manager 218. The system 200 can represent a relatively large corporate mainframe environment in which the mainframe computer 204 includes relatively large amounts of data storage, such as the mainframe data 214. The mainframe computer 204 can be connected to the internet 206 or the intranet 208. Authorized clients, such as the computing devices 202, can access the mainframe data 214 through computing devices 202 that are connected directly to the mainframe computer 204, through the Internet 206, or intranet 208.

The computing devices 202 that are connected directly to the mainframe computer 204 can access mainframe data 214 directly. The computing devices 202 that are connected through the Internet 206 or intranet 208 can log in as mainframe clients.

The processor 210 can be a computer processor, computer processing circuit, central processing unit (CPU) and the like. The operating system 212 can be software that supports functions of the mainframe computer 204, such as scheduling, executing applications, and operating peripheral components.

The mainframe computer 204 can be used by large organizations for processing-heavy applications. Processing-heavy applications can be computer applications that process relatively large amounts of data, such as national customer databases, the census, and the like. In this way, relatively large processing and data storage systems, such as those used by Fortune 600 Companies, can store relatively large amounts of information and processing logic on the mainframe computer 204. For example, the mainframe computer 204 can include mainframe data 214. The mainframe data 214 can include various types of data files stored in various formats. As shown, the mainframe data 214 can include COBOL files, JCL files, internal processes (PROCs), control cards (CNTLCARD), virtual storage access method (VSAM) files, transaction processing system (TIPS) files, documents (DOCS), emails, DB2 database files, a sort utility, and SAS files, for example. Internal processes can include computer applications that provide scheduling and other maintenance functions. Control cards are individual or sets of parameter specifications used by internal processes and utilities of the mainframe computer 204. For example, control cards can be used to configure specific executions of the sort utility. The control cards can specify the fields in a computer file that are used to sort the file. In such a case, the control cards can also specify whether the sort order is ascending or descending. VSAM files can be used to automatically store records in a file based on a predetermined index. TIPS can be a suite of computer applications that provide an environment for user interfaces. Mainframe data 214 can additionally include files to support databases. A database can be a suite of applications that support the creation of organized datasets. The datasets can be organized in tables with predetermined indices. The tables and indices can be configured for a specific type of access, such as hierarchical and relational.

In some cases, the mainframe data 214 can also include extended binary coded decimal interchange code (EBCDIC) characters that may not be recognizable, and thus not printable, by some computers. EBCDIC characters can be stored in mainframe data 214 and the searchable database 216. Thus, replacing EBCDIC characters with space characters would additionally make it possible to use FTP for file transfers of the mainframe data 214.

According to embodiments of the present disclosure, the mainframe data 214 can include files with problematic characters. Additionally, or alternatively, some subset of the mainframe data 214 can be loaded in the searchable database 216. The searchable database 216 can be a collection of uniquely searchable database-abstracted mainframe flat files that are generated from the mainframe data 214. Alternatively, the searchable database 216 can be used as a data store for various computer applications hosted on the mainframe computer 204.

The RPC manager 218 can be a utility that provides a searchable mechanism for identifying problematic characters in relatively large data storage systems that have multiple data elements and data types, such as the mainframe data 214 and the searchable database 216. For example, each data element can potentially include multiple strings of printable and non-printable characters and words. According to embodiments of the present disclosure, the RPC manager 218 can read the files of the mainframe data 214 to locate problematic characters, and replace the problematic characters with a predetermined replacement characters. Further, the RPC manager 218 can store a subset of the mainframe data 214 in the searchable database 216. The RPC manager 218 can also read all the rows of the searchable database 216, to search the character, strings or words of each data type field for non-printable characters. Additionally, the RPC manager 218 can update each row where a non-printable character is found by replacing the non-printable character with a space character.

According to embodiments of the present disclosure, the RPC manager 218 can be a specific configuration of the sort utility of the mainframe computer 204. More specifically, the sort utility can be configured to replace non-printable characters with space characters in the mainframe data 214.

Thus, the RPC manager 218 can perform a search on relatively large data storage files or a uniquely searchable database abstracted comprehensive mainframe flat file, such as the mainframe data 214 or the searchable database 216. According to embodiments of the present disclosure, the RPC manager 218 can thus replace problematic characters within the searchable database 216 with predetermined replacement characters.

In this way, the RPC manager 218 can efficiently replace problematic characters in relatively large datasets that include diverse types of data. Further, the RPC manager 218 can relatively quickly locate and replace problematic characters from relatively large volumes of data and data elements. In this way, a search and replace method that can take many hours on current systems can instead be performed by the RPC manager 218 in mere seconds with more accurate results.

Figure 3:
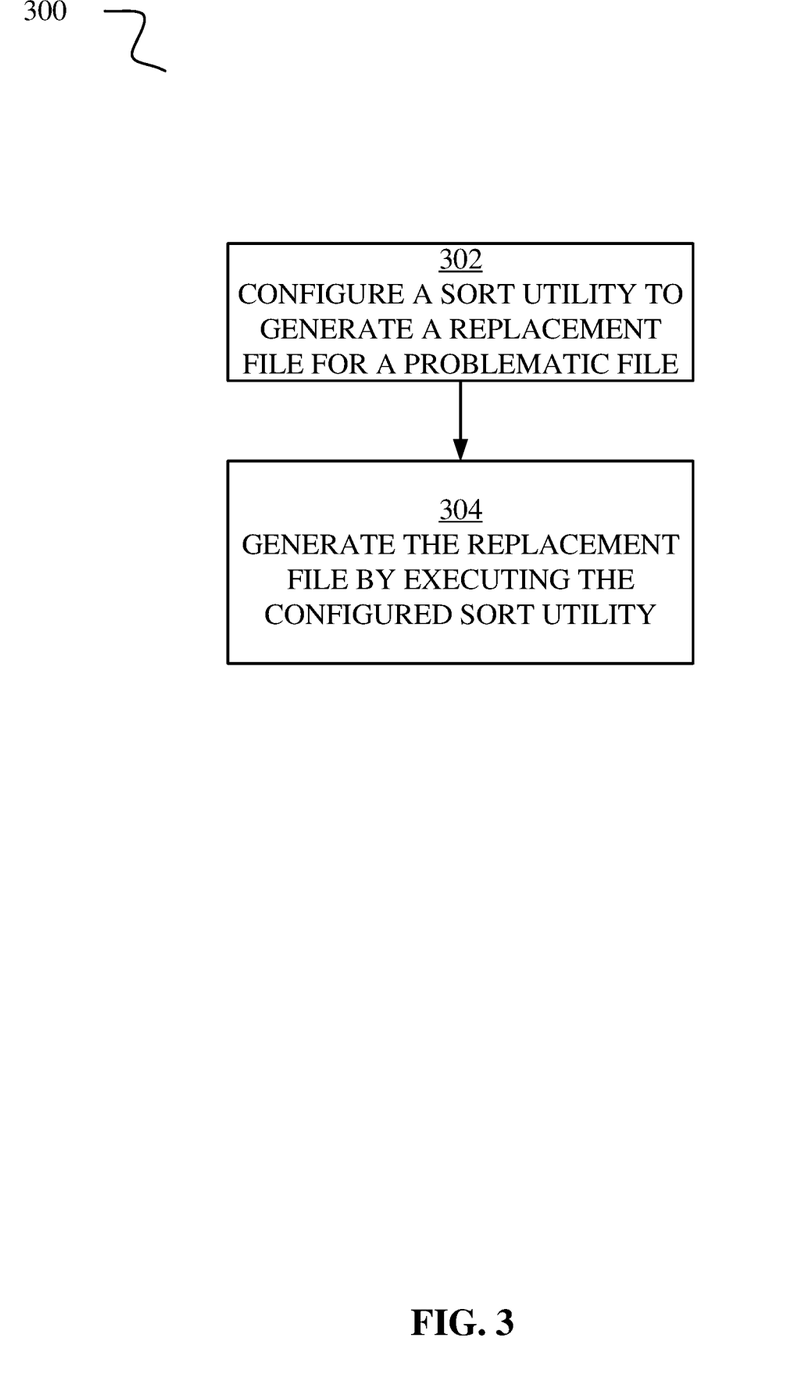
FIG. 3 illustrates a flowchart of an example method for replacing problematic characters, in accordance with embodiments of the present disclosure.

Referring now to FIG. 3, which is a flowchart of an example method 300 for replacing problematic characters, in accordance with embodiments of the disclosure. The method 300 can be performed by an RPC manager, such as the RPC manager 218 described with respect to FIG. 2.

Referring back to FIG. 3, at block 302, the RPC manager 218 can configure a sort utility of an operating system to generate a replacement file for a problematic file. According to embodiments of the present disclosure, the replacement file can resolve a problem associated with the problematic file. For example, the problematic file can contain non-printable characters. The RPC manager 218 can configure the sort utility by providing an input to the sort utility that specifies one or more problematic characters and one or more replacement characters. As described above, the problematic characters can include the non-printable ASCII characters, and the replacement characters can be space characters.

At block 304, the RPC manager 218 can generate the replacement file by executing the configured sort utility. Accordingly, the configured sort utility can copy each record of the problematic file to the replacement file. Additionally, the configured sort utility can replace all the problematic characters from the problematic file with the replacement character in the replacement file. In other words, instead of copying the non-printable characters to the replacement file, the configured sort utility can copy pre-determined replacement characters. In this way, the RPC manager 218 generates a replacement file for the problematic file that resolves the problem of the problematic file. For example, the RPC manager 218 can resolve the issue of printing errors that can occur with the problematic file by providing a replacement file where the non-printable characters from the problematic file are replaced with printable space characters. In this way, the RPC manager 218 can configure and execute the sort utility to replace non-printable characters with printable characters, such as space characters.

In some embodiments, the RPC manager 218 can perform the method 300 at regular intervals, such as weekly or biweekly. In this way, the RPC manager 218 can keep mainframe data, such as the mainframe data 214, current. Similarly, the RPC manager 218 can keep a searchable database, such as the searchable database 216 current by performing the method 300 at regular intervals.

Figure 4:
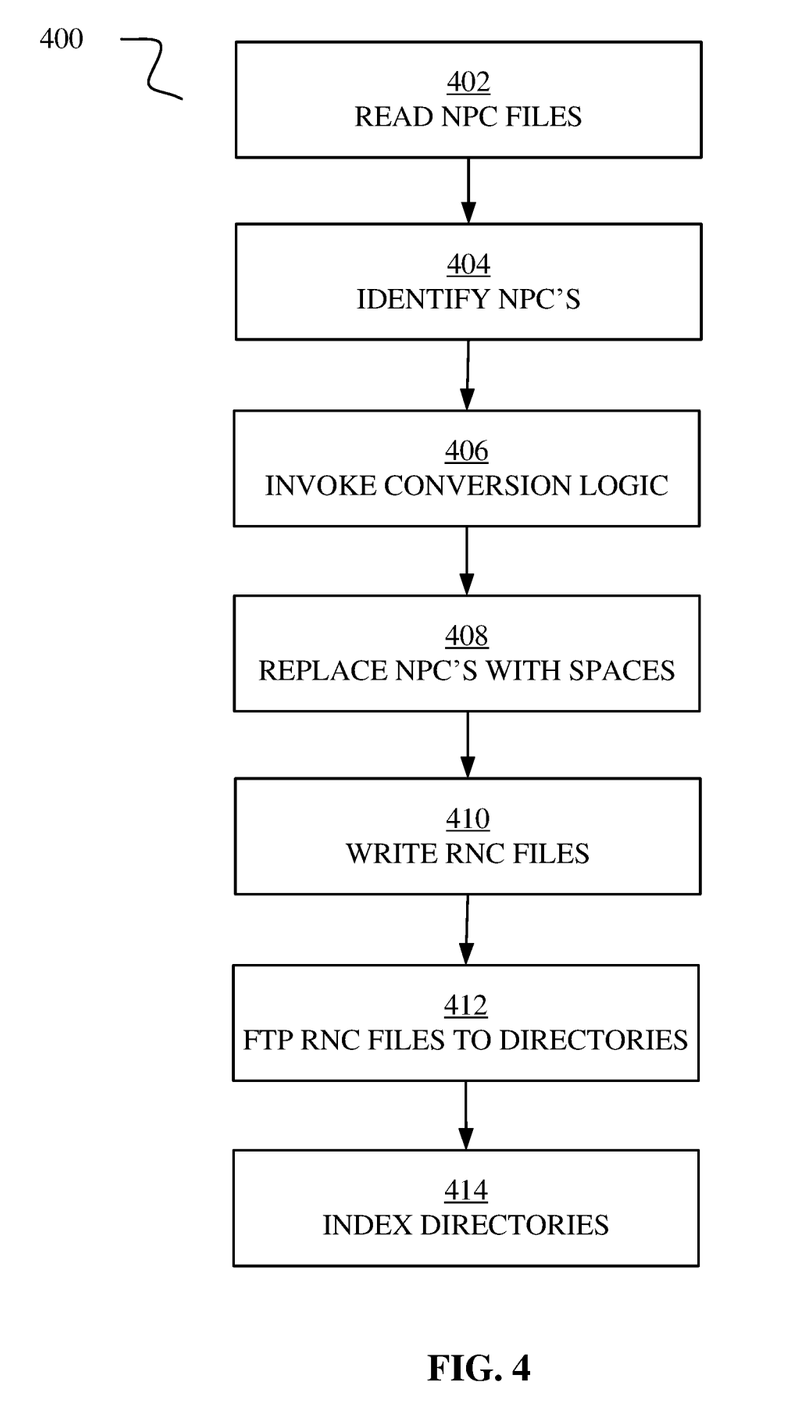
FIG. 4 illustrates a flowchart of an example method for replacing non-printable characters, in accordance with embodiments of the present disclosure.

Referring now to FIG. 4, which is a flowchart of an example method 400 for replacing non-printable characters, in accordance with embodiments of the disclosure. The method 400 can be performed by the RPC manager 218.

At block 402, the RPC manager 218 can read non-printable character (NPC) files. The NPC files can be data sets or other organized data storage, such as the mainframe data 214 and searchable database 216.

At block 404, the RPC manager 218 can identify the NPC's in the mainframe data 214 and/or searchable database 216. As stated previously, the NPCs can include the characters represented by ASCII code values from x0 to x3F and x7F to xFF.

At block 406, the RPC manager 218 invokes conversion logic. Invoking conversion logic can involve configuring the sort utility by specifying the non-printable character codes and the replacement space character in a control card. Additionally, invoking the conversion logic can involve executing the configured sort utility.

At block 408, the RPC manager 218 can replace the NPC's with space characters as specified in the control card. Thus, each one of the non-printable characters, such as x00, is converted to x40, which is a space character. The RPC manager 218 can identify any characters with a hex value of the remaining 162 non-printable character list and converts them to the hex value of the space character or any other predetermined character. In this way, the RPC manager 218 can avoid costly software engineers that spend time coding in SAS or COBOL program.

At block 410, the RPC manager 218 can write the removed non-printable character (RNC) files. The RNC files can include, for example, the replacement files described above.

At block 412, the RPC manager 218 can file transfer protocol (FTP) the RNC files to directories. The directories can include file systems of remote computers. While FTP can provide relatively fast file transfer speeds, it can be challenging to FTP files that contain NPC's. For example, file transfers can error because of the presence of NPC's. As such, because the RNC files do not contain NPC's, the RPC manager 218 can FTP the RNC files without such errors.

At block 414, the RPC manager 218 can index the directories. According to embodiments of the present disclosure, the RPC manager 218 can maintain a local index of the remote directories to which the RNC files are FTP'd.

The method 400 can be advantageously used by organizations with relatively smaller searchable databases 216. In contrast, the process illustrated in FIG. 4 for removal of the non-printable characters created in accordance with the process of FIG. 3, is more capable and robust for updating the searchable database 216 and can be advantageously used by relatively larger organizations with relatively more complex data retrieval and removal processes.

Figure 5:
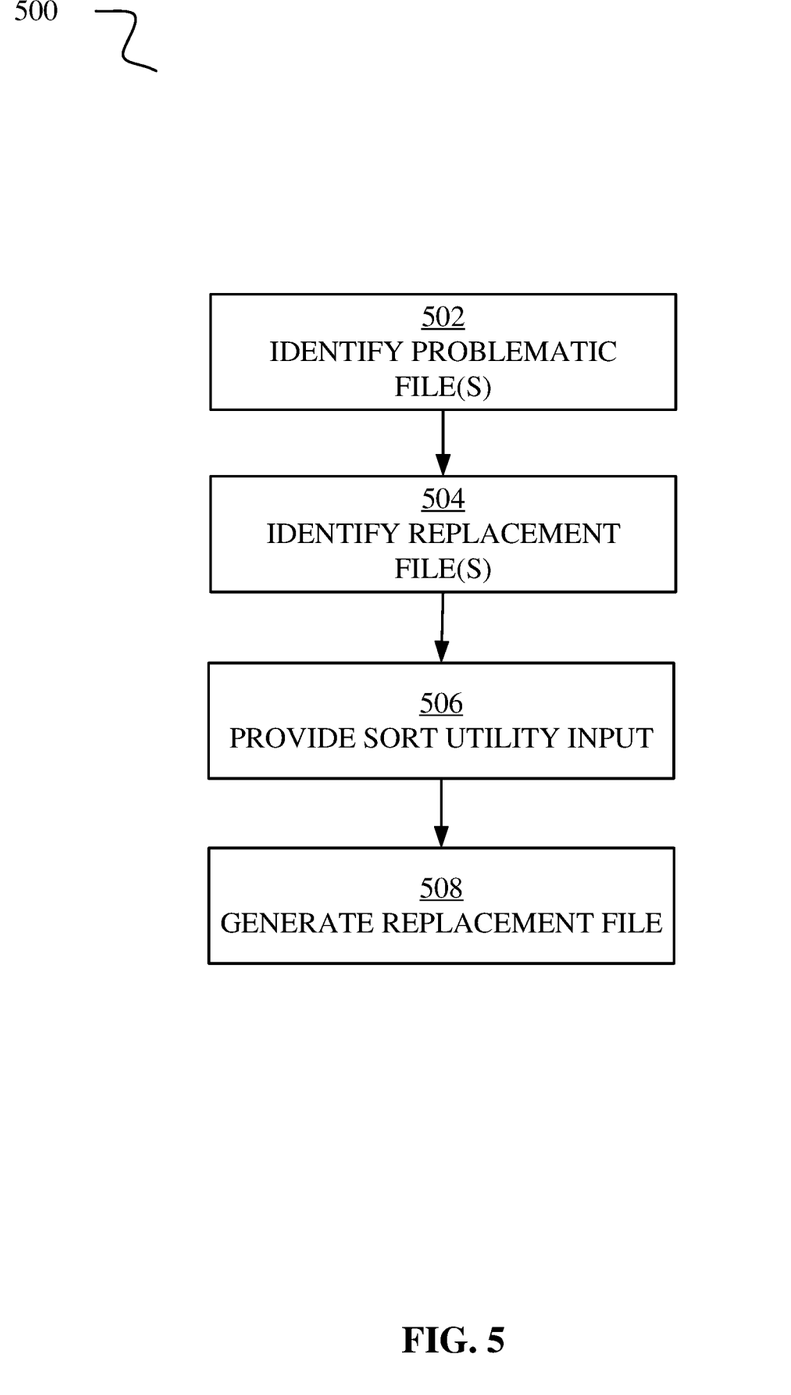
FIG. 5 illustrates a flowchart of an example method for replacing problematic characters, in accordance with embodiments of the present disclosure.

Referring now to FIG. 5, which is a flowchart of an example method 500 for replacing problematic characters, in accordance with embodiments of the disclosure. The method 500 can be performed by the RPC manager 218.

According to some embodiments of the present disclosure, the RPC manager 218 can be a mainframe job defined by a set of JCL statements. In such embodiments, the RPC manager 218 can include JCL EXAMPLE 3:

| JCL EXAMPLE 3 |
| --- |
| //************************************************************ |
| //** REPLACE UNPRINTABLE CHARACTERS WITH SPACES |
| //************************************************************ |
| //RPC-MGR     XQT     PROGRAM=SORT |
| //SORTIN      DD      PROBLEMATIC-FILE, PROBLEMATIC-FILE-PARMS |
| //SORTOUT     DD      REPLACEMENT-FILE, REPLACEMENT-FILE-PARMS |
| //SYSIN       DD      SORT-CHAR-FILE, sort-CHAR-PARMS |
| //SYSOUT      DD      SYSOUT=* |

The first three lines of JCL EXAMPLE 3 include comment cards that can be used for annotation. The next JCL statement defines a job name (RPC-MGR) and a command to execute the sort utility of the operating system 212. However, this statement does not start the execution of the sort utility until the sort utility is configured. The JCL statements that follow thus configure the sort utility to perform the techniques of the RPC manager 218. As described below, in blocks 502 through 506, the RPC manager 218 can configure the sort utility to remove problematic characters from files.

At block 502, the RPC manager 218 can identify one or more problematic files to a sort utility. In the JCL EXAMPLE 3, the first JCL statement after the EXEC statement defines one of the input files to the sort utility, SORTIN. In the JCL EXAMPLE 3, the SORTIN input is the file containing the problematic characters, e.g., PROBLEMATIC-FILE. JCL statements that make reference to files can include predetermined file parameters, e.g., PROBLEMATIC-FILE-PARMS. These predetermined file parameters can specify characteristics of the file being referenced, such as a volume location, record sizes, retention details, and the like.

At block 504, the RPC manager 218 can identify one or more replacement files. In the JCL EXAMPLE 3, the next JCL statement defines an output file of the sort utility, e.g., REPLACEMENT-FILE and the associated REPLACEMENT-FILE-PARMS. The sort utility can populate the REPLACEMENT-FILE with a copy of the PROBLEMATIC-FILE, wherein the problematic characters are replaced with characters that resolve the problem, e.g., non-printable characters can be replaced with space characters.

At block 506, the RPC manager 218 can provide a sort utility input. The next JCL statement defines another input file to the sort utility, SYSIN. The sort utility can use the SYSIN file to determine how to process the SORTIN and SORTOUT files. For example, the SYSIN file can define specific functions to perform within the sort utility, such as sorting the records in the SORTIN file in a predetermined order and populating the SORTOUT file with the sorted records of the SORTIN file. According to embodiments of the present disclosure, the SYSIN file can include a command and parameters to direct the sort utility to perform character replacement. The parameters can include one or more problematic characters and one or more associated replacement characters. In JCL EXAMPLE 3, the SYSIN file is named, sort-CHAR-FILE and has associated sort-CHAR-FILE-PARMS. The following sort-CHAR-FILE EXAMPLE includes the command and parameters to replace non-printable characters with space characters:

---
SORT-CHAR-FILE EXAMPLE
---
SORT FIELDS=COPY
ALTERNATE CODES=(00\40, 01\40 ... 4F\40, 8F\40 ... FF\40)
OUTRECORD FIELDS=(1,RECORD-SIZE)
---

The first line of sort-CHAR-FILE EXAMPLE can define the function performed by the sort utility. In sort-CHAR-FILE EXAMPLE, the function is, "COPY." In other words the sort utility is being directed to copy the SORTIN file (PROBLEMATIC-FILE) to the SORTOUT file (REPLACEMENT-FILE).

The next line of the sort-CHAR-FILE EXAMPLE defines parameters of the COPY function. More specifically, the term, "ALTERNATE CODES," can define a specific character to be replaced and its replacement character. All the characters to be replaced and their replacement characters can be included within a set of parentheses, and delimited by the "/" and comma characters. The "/" character can delimit the character to be replaced and its replacement. Thus, for the parameter, 00\40, the sort utility can replace all characters in the SORTIN file having a hexadecimal value of 00 with the hexadecimal value of 40. The hexadecimal value 40 can be the ASCII code for the space character. Additionally, all ASCII values between x00 and x3F, and between x7F and xFF, are replaced with the space character. The OUTRECORD statement can define specific parameters of the SORTOUT file, such as the RECORD SIZE.

At block 508, the RPC manager 218 can generate the replacement file. Referring back to JCL EXAMPLE 3, the SYSOUT JCL statement can define an output file to document the results of running the RPC-MGR job. Thus, the operating system 212 can store any informational statements related to, or actions resulting from, the JCL statements in the RPC-MGR job. Once the SYSOUT definition is complete, the configured sort utility can begin execution accordingly. Thus, the sort utility can copy the SORTIN file to the SORTOUT file, while replacing the problematic characters with replacement characters as specified in the SYSIN file.

In an example implementation, a searchable database with non-printable characters was created. The example searchable database contains 50,000 records with a record length of 659 characters. The problematic characters were removed from this example searchable database using a SAS tool, a COBOL tool, and a sort utility configured according to the techniques described herein. In this example implementation, the SAS tool converted the non-printable characters to printable characters in the example searchable database in 0.65 seconds. In this example implementation, the COBOL tool converted the non-printable characters to printable characters in the example searchable database in 0.82 seconds. In this example implementation, the sort utility configured as described herein converted the non-printable characters to printable characters in the example searchable database in 0.12 seconds.

This example implementation demonstrates relatively large savings in CPU processing. The CPU processing time for the configured sort utility is 81% less than that of the SAS tool. The CPU processing time for the configured sort utility is 85% less than that of the COBOL tool.

Additionally, the RPC manager 218 can be customized based on any requirements for the replacement file. The control card input to the sort utility can identify any characters that can be consider as problematic, and what replacement characters can resolve the problem. Less expertise, and fewer tools, may be involved in changing the control card of the sort utility than changing a COBOL or SAS program.

Figure 6:
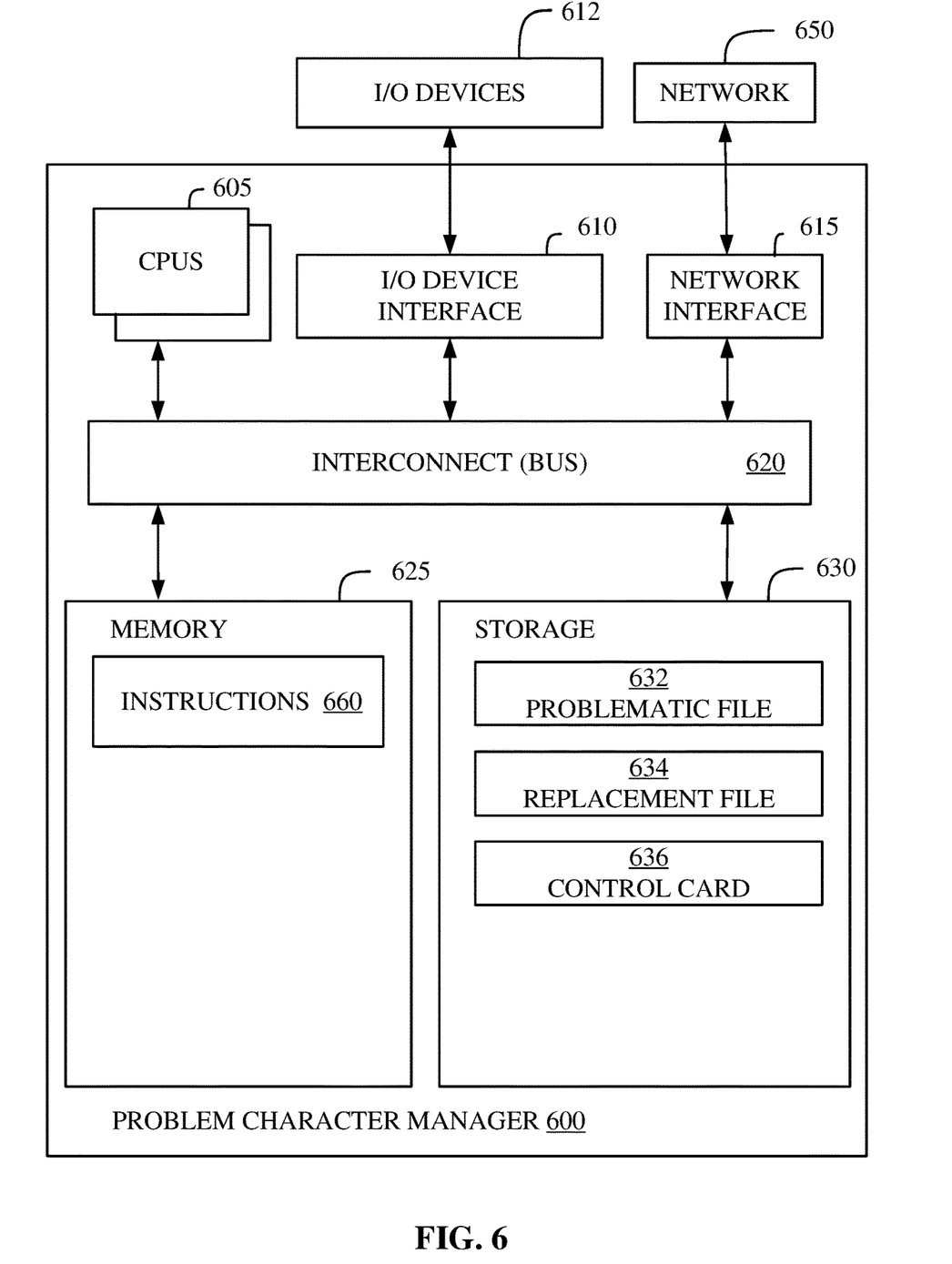
FIG. 6 illustrates a block diagram of an example problematic character manager, in accordance with embodiments of the present disclosure.

Referring now to FIG. 6, illustrated is a block diagram of an example problem character manager 600, in accordance with embodiments of the present disclosure. In various embodiments, the problem character manager 600 is similar to the RPC manager 112 and RPC manager 218 and can perform the methods described in FIGS. 3-5 and/or the functionality discussed in FIGS. 1-2. In some embodiments, the problem character manager 600 provides instructions for the aforementioned methods and/or functionalities to a client machine such that the client machine executes the method, or a portion of the method, based on the instructions provided by the problem character manager 600. In some embodiments, the problem character manager 600 comprises software executing on hardware incorporated into a plurality of devices.

The problem character manager 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or the storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 4D integrated circuits (3DICs) (e.g., 4D wafer-level packaging (3DWLP), 4D interposer based integration, 4D stacked ICs (3D-SICs), monolithic 4D ICs, 4D heterogeneous integration, 4D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, and/or flash memory devices. Additionally, the storage 630 can include storage area-network (SAN) devices, the cloud, or other devices connected to the problem character manager 600 via the I/O device interface 610 or a network 650 via the network interface 615.

In some embodiments, the memory 625 stores instructions 660, a problematic file 632, replacement file 634, and control card 636. However, in various embodiments, the instructions 660, problematic file 632, replacement file 634, and control card 636 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all, any of the methods of FIGS. 3-5 and/or any of the functionality discussed in FIGS. 1-2.

The problematic file 632 can be similar to the problematic files described above with respect to FIGS. 1-5, containing problematic characters, such as NPC's. The replacement file 634 can be similar to the replacement files described above with respect to FIGS. 1-5, wherein the problematic characters from the problematic file 632 are replaced with replacement characters that resolve the problem. The control card 636 can be similar to the sort-CHAR-FILE, i.e., SYSIN, described above with respect to FIG. 5. The control card 636 can thus, for example, specify a copy operation, the characters to be replaced, and the replacement characters.

In various embodiments, the I/O devices 612 include an interface capable of presenting information and receiving input. For example, I/O devices 612 can present information to a user interacting with problem character manager 600 and receive input from the user.

The problem character manager 600 is connected to the network 650 via the network interface 615. Network 650 can comprise a physical, wireless, cellular, or different network.

In some embodiments, the problem character manager 600 can be a multi-user mainframe computer system, a single-user system, or a server computer or similar device that has little or no direct user interface but receives requests from other computer systems (clients). Further, in some embodiments, the problem character manager 600 can be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary problem character manager 600. In some embodiments, however, individual components can have greater or lesser complexity than as represented in FIG. 6, components other than or in addition to those shown in FIG. 6 can be present, and the number, type, and configuration of such components can vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for problematic characters comprising:
    configuring a sort utility of an operating system to generate a replacement file that resolves a problem of a problematic file by:
        identifying the problematic file, wherein the problematic file comprises a database;
        identifying the replacement file; and
        providing an input to the sort utility that specifies a problematic character and a replacement character;
    generating the replacement file by executing the configured sort utility; and
    confirming a resolution of the problem by presenting an interface comprising:
        a representation of the problematic file; and
        a representation of the replacement file.

2. The method of claim 1, wherein the problem causes an error associated with attempting to print the problematic character.

3. The method of claim 1, wherein the input to the sort utility specifies a record size for the problematic file that is larger than 80 characters.

4. The method of claim 1, wherein the configured sort utility:
    copies the problematic file to the replacement file; and
    replaces a plurality of problematic characters in the problematic file with the replacement character in the replacement file.

5. The method of claim 1, further comprising specifying a column of a record of the problematic file that the configured sort utility copies to the replacement file without replacing the problematic character.

6. The method of claim 1, wherein:
    the input to the sort utility specifies an additional problematic character; and
    the configured sort utility replaces a plurality of additional problematic characters in the problematic file with the replacement character in the replacement file.

7. The method of claim 6, wherein:
    the input to the sort utility specifies an additional replacement character; and
    the configured sort utility replaces a plurality of additional problematic characters in the problematic file with the additional replacement character in the replacement file.

8. The method of claim 1, further comprising performing a file transfer protocol (FTP) of the replacement file as a replacement for the problematic file.

9. A computer program product comprising program instructions stored on a computer readable storage medium, wherein the computer readable storage medium is not a transitory signal per se, the program instructions executable by a processor to cause the processor to perform a method comprising:
    configuring a sort utility of an operating system to generate a replacement file that resolves a problem of a problematic file by:
        identifying the problematic file, wherein the problematic file comprises a database;
        identifying the replacement file; and
        providing an input to the sort utility that specifies a problematic character and a replacement character;
    generating the replacement file by executing the configured sort utility; and
    confirming a resolution of the problem by presenting an interface comprising:

a representation of the problematic file; and
a representation of the replacement file.

10. The computer program product of claim 9, wherein the problem causes an error associated with attempting to print the problematic character.

11. The computer program product of claim 9, wherein the input to the sort utility specifies a record size for the replacement file.

12. The computer program product of claim 9, wherein the configured sort utility:
  copies the problematic file to the replacement file; and
  replaces a plurality of problematic characters in the problematic file with the replacement character in the replacement file.

13. The computer program product of claim 9, the method further comprising specifying a column of a record of the problematic file that the configured sort utility copies to the replacement file without replacing the problematic character.

14. The computer program product of claim 9, wherein:
  the input to the sort utility specifies an additional problematic character; and
  the configured sort utility replaces a plurality of additional problematic characters in the problematic file with the replacement character in the replacement file.

15. The computer program product of claim 14, wherein:
  the input to the sort utility specifies an additional replacement character; and
  the configured sort utility replaces a plurality of additional problematic characters in the problematic file with the additional replacement character in the replacement file.

16. The computer program product of claim 9, the method further comprising performing a file transfer protocol (FTP) of the replacement file as a replacement for the problematic file.

17. A system comprising:
a computer processing circuit; and
a computer-readable storage medium storing instructions, which, when executed by the computer processing circuit, are configured to cause the computer processing circuit to perform a method comprising:
  configuring a sort utility of an operating system to generate a replacement file that resolves a problem of a problematic file, wherein the problem causes an error associated with attempting to print a problematic character, by:
    identifying the problematic file, wherein the problematic file comprises a database;
    identifying the replacement file; and
    providing an input to the sort utility that specifies the problematic character and a replacement character;
  generating the replacement file by executing the configured sort utility; and
  confirming a resolution of the problem by presenting an interface comprising:
    a representation of the problematic file; and
    a representation of the replacement file.

18. The system of claim 17, wherein the configured sort utility:
  copies the problematic file to the replacement file; and
  replaces a plurality of problematic characters in the problematic file with the replacement character in the replacement file.

19. The system of claim 17, the method further comprising specifying a column of a record of the problematic file that the configured sort utility copies to the replacement file without replacing the problematic character.

20. The system of claim 17, the method further comprising performing a file transfer protocol (FTP) of the replacement file as a replacement for the problematic file.

* * * * *